July 24, 1962 P. R. HOFFMAN 3,046,407

RECORD READER

Filed July 27, 1960 3 Sheets-Sheet 1

INVENTOR.
PAUL R. HOFFMAN
BY William R. Nolte
AGENT

July 24, 1962 P. R. HOFFMAN 3,046,407

RECORD READER

Filed July 27, 1960 3 Sheets-Sheet 2

INVENTOR.
PAUL R. HOFFMAN

BY William R. Nolte

AGENT

INVENTOR.
PAUL R. HOFFMAN
BY
William R. Nolte
AGENT

United States Patent Office 3,046,407
Patented July 24, 1962

3,046,407

RECORD READER

Paul R. Hoffman, Woodlyn, Pa., assignor to Burroughs Corporation, Detroit, Mich., a corporation of Michigan Filed July 27, 1960, Ser. No. 45,639
9 Claims. (Cl. 250—219)

This invention relates to record reading devices and more particularly to such devices including apparatus capable of providing output signals for use in apparatus such as teletype lines, computers, or printers and the like.

In the prior art, readers are available for reading record members, such as cards and tapes, which store coded information by particular combinations of holes and the absence of holes arranged in rows and columns across the surface of the record member. The holes contained in each row represent combinations of binary bits indicative of an individual character, such as, for example, a decimal digit. Readers are also available for reading printed indicia such as spots disposed in a similar fashion upon a record member. With the increasing acceptance and use of such record members, there has now arisen the need for compatible readers that will read either printed or punched records.

Accordingly, an important object of the present invention is to provide an improved reading apparatus adapted to read either printed or perforated records.

Another important object of the invention is to provide novel reading apparatus having plural modes of operation, one for reading a printed record wherein light is reflected from surfaces thereof to activate a plurality of photo-sensitive devices, and another for reading a perforated record wherein light is directed through each perforation twice prior to activating the photo-sensitive devices.

Another important object of the present invention is to provide novel apparatus for reading indicia on a planar record medium wherein light from a source is directed to said indicia at a first angle relative to said record medium and is thereafter caused to be reflected at a different angle with respect to said record medium to be received by photo-responsive means.

Another important object of the invention is to provide novel optical apparatus for reading records bearing data which is in the form of printed or punched indicia.

Briefly, the record reader of this invention comprises a light source, means to direct light rays from the source to the record medium, an optical reflecting device, and a bank of photocells for light pick-up and signal emission. The light source and the photocells are located relative to one surface of the record medium such that light rays emitted from the source to the record medium must be reflected from the record medium at a dissimilar angle relative to the record medium to be picked up by the photocells. In this manner when reading a printed record medium only diffused light reflected therefrom enters the photocells, and not the specularly reflected light as occurs when the light paths to both the light source and the photocells are at the same angle with the surface of the record medium. This arrangement eliminates the gloss or glare effect which could be caused by the printed spot and the background area of the record medium reflecting almost the same amount of light. In the alternative mode of operation, as when reading perforated records, the light passes through the holes in the record medium at one angle to an optical device and is reflected thereby back through the holes a second time and into the photocells at a different angle.

For a better understanding of the invention, reference is made to the accompanying detailed description of a representative embodiment which is illustrated in the accompanying drawings in which.

Figure 1:
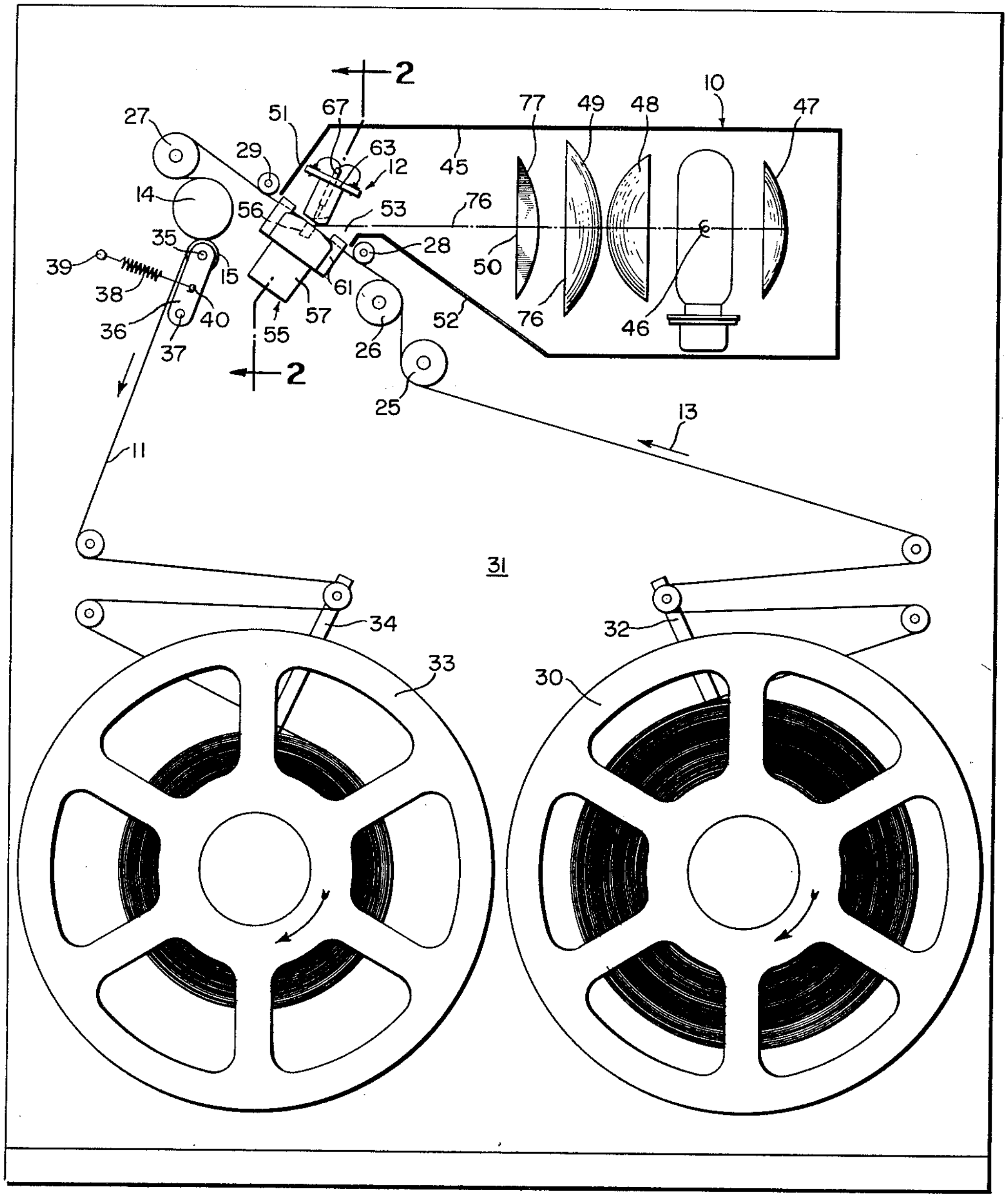
FIG. 1 is a somewhat diagrammatic front elevational view of the preferred embodiment of the reader.
Figures 2, 3, 4, 5, 6:
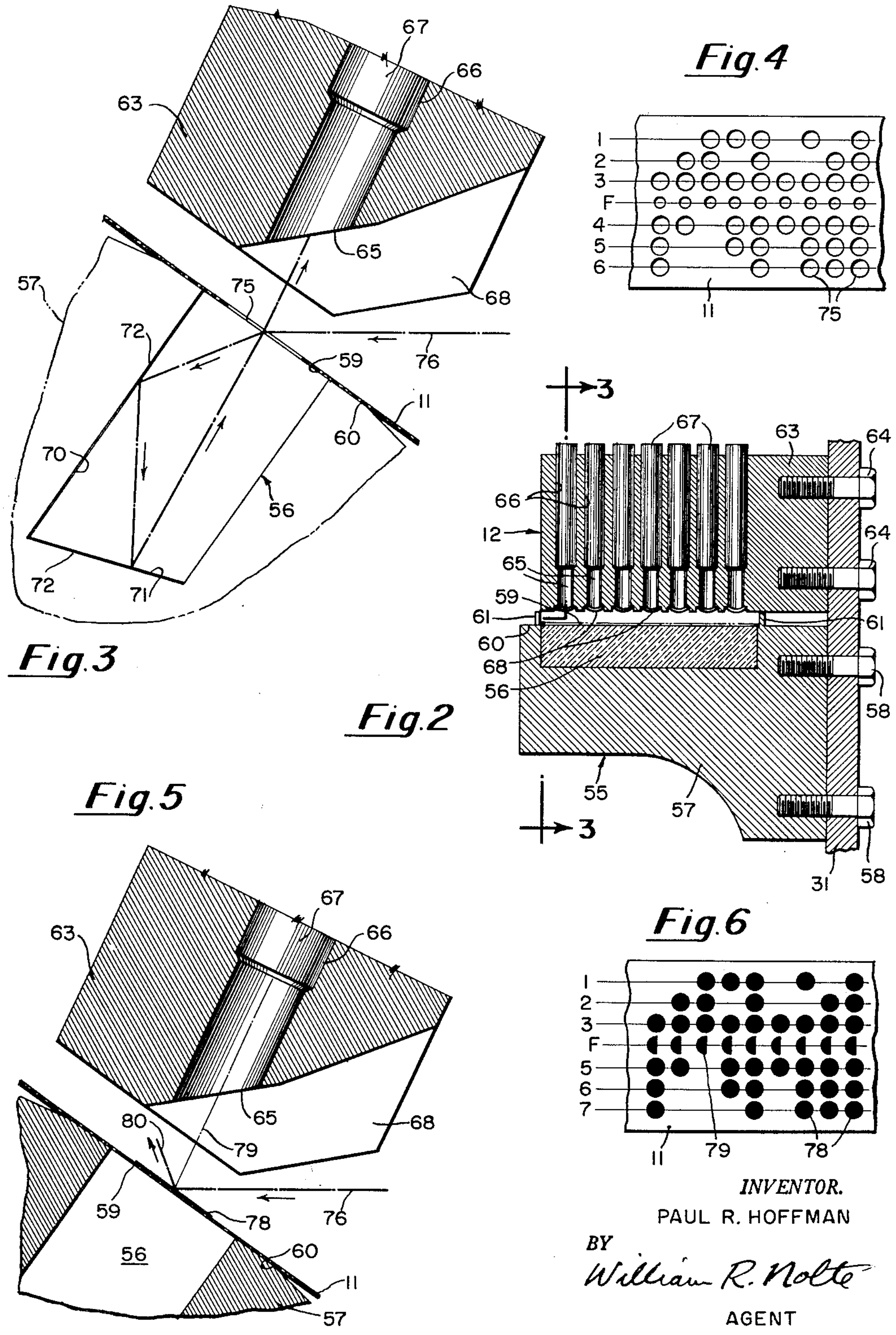
FIG. 2 is a sectional view taken along the line 2—2 of FIG. 1.
FIG. 3 is a fragmentary enlarged sectional view taken along the line 3—3 of FIG. 2 illustrating the scanning of a perforated tape.
FIG. 4 is a plan view of the perforated tape shown in FIG. 3.
FIG. 5 is a view similar to that illustrated in FIG. 3 and illustrating the scanning of tape having printed spots thereon.
FIG. 6 is a plan view of the tape having spots printed thereon.

Referring first to FIG. 1, the preferred embodiment of the invention is shown as comprising a light source unit 10 from which light is directed to the record medium, such as tape 11, to be reflected to a photo-responsive unit 12. Tape 11 may be of any width but as shown in FIGS. 4 and 6 comprises six positions or channels across its width such as 1–6 inclusive. The photo pick-up elements such as photo-diodes 12 sense the presence or absence of holes or spots—depending upon which is being read—as the tape is transported past the reading station. Tape 11 is advanced in the direction of arrow 13 by a rotating drive capstan 14 when pinch roller 15 urges the tape into contact with the capstan. Guide rolls 25, 26 and 27 and smaller rolls 28 and 29 maintain the moving tape in its appropriate path relative to the reader unit. A supply reel 30 is suitably mounted for rotation on side panel 31 and a control arm 32 is provided to tension the tape. A take-up reel 33 employing a similar arm 34 may be utilized to control the torque applied to the take-up reel by motor means not shown. The aforementioned pinch roller 15 is suitably mounted by means of pivot pin 35 which extends between a pair of arms 36, only one of the latter being shown. The pair of arms 36 are correspondingly mounted for pivotal movement about pivot 37 and are urged in a counterclockwise direction about the pivot by means of spring 38 connected at one of its ends to pin 39 which is affixed to side plate 31 and at its other end to pin 40 affixed to one of the arms 36. Clockwise rotation of the arms 36 urges the pinch roller 15 and tape 11 into contact with capstan 14.

Still referring to FIG. 1, the light source unit 10 is shown enclosed within a light-tight chamber 45 and which includes a light filament 46 and a reflector 47. Two spherical lenses 48 and 49 are provided to collimate the light, while cylindrical lens 50 functions to converge the light to a narrow area corresponding to a row of indicia appearing on the tape. The housing 45 includes wall portions 51 and 52 inclined toward each other and includes marginal edges which define an opening 53 into which is received the aforementioned photo-responsive unit 12. Underneath the latter unit and adjacent the opposite surface of the tape from that which the light and photo pick-up units are located is an optical reflective unit 55. The latter optical reflective unit may take various forms such as angularly related mirrors, light pipes, etc. but in the present embodiment of the invention is shown in FIG. 2 as comprising a prism 56 recessed within anvil 57 which is secured to side wall 31 by means of bolts 58. The top surface 59 of the prism element preferably is flush with the top surface 60 of the anvil and the combined surfaces provide a planar or continuous flat surface over which the tape 11 is moved. A pair of projections or lugs 61 etxend upwardly from the top surface 60 of the anvil and serve to guide the tape in its movement therebetween.

The aforementioned photocell unit 12 includes a holder 63 which is secured to side plate 31 by bolts 64 in the same manner that the anvil 57 is secured thereto. The holder includes in the presently illustrated embodiment of the invention seven equally spaced holes 65 corresponding to the six channels 1–6 inclusive of the tape plus the feed channel "F" thereof, FIGS. 4 and 6. In this embodiment the holes are arranged at an angle of slightly less than 90° relative to surface 59 of prism 56. The holes 65 are counter bored from the top of the holder with slightly larger holes as at 66 to receive a photo pick-up device 67 in each of the counter bores. The photocell holder 63 also includes a plurality of slots 68 one each for each of the holes 65 and in line with the holes and the light source so as to provide ample clearance for the rays of light projected from the light source 46 and a row of indicia on the tape 11.

Referring now to FIG. 3, an enlarged sectional view is shown through one of the photo pick-up elements and the anvil supporting the internal reflecting prism 56 therebeneath to illustrate one mode of operation of the reading device. The prism 56 is quadrangular in form with its back and bottom faces 70, 71 respectively coated with silver as at 72. A tape 11 having apertured data therein is shown in its position passing over the top surface or face of the prism. The angular configuration of the faces of the prism is such that light rays from the source, filament 46, FIG. 1 and the rays reflected from reflector 57 pass through spherical lenses 48, 49 to collimate, i.e., render the light parallel. Upon passing from surface 76 of lens 49 the light rays pass to surface 77 of the cylindrical or condenser lens 50. The light rays are then converged into a thin band of light so as to concentrate on a row of indicia of the tape. In FIG. 3, only the collimating line or ray 76 of the optical system is shown passing through an apeture 75 of the tape to enter the prism where it is refracted against face 72 from which it is reflected to bottom face 71. The bottom face 71 is made at such an angle relative to the back surface 70 that the reflection from those surfaces combined with a slight refraction at the top face 59—due to the slightly different angle of these faces—directs the light rays to the angularly displaced photocells 67 without additional optical elements.

In the alternate mode of operation illustrated in FIG. 5, a tape 11 having printed data thereon is shown in position to be examined by the tape reading apparatus. The tape is of the type shown in FIG. 6 having spots 78 printed thereon and disposed in rows and channels. The tape but for the printed spots thereon is similar to the apertured tape illustrated in FIG. 4 and also includes six channels designated 1–6 inclusive and a feed channel "F" made up of semi-circular spots 79, which constitute "sprocket" dots but which are used for timing purposes. The light from the source as indicated by collimating ray 76 (FIG. 5) follows the same angle as in FIG. 3 to strike a row of spots on the tape. The light which strikes the spots, however, is not reflected directly into the photocell units 67 because of the offset angular position of the latter units relative to the plane or surface of the tape. The pick-up units instead are sensitive to or read the diffused light from the tape and thereby sense a difference in color or contrast when a printed spot passes beneath it. By way of example, if the tape is made of white paper and has black spots printed thereon, a light ratio of better than 20 to 1 may be observed between the white background response and the black spot response. Considering the mode of reading in FIG. 5 in greater detail, only that portion of the diffused light which is at approximately a right angle to the paper surface, as indicated at 79, enters the photocell 67, and not the specularly reflected light as indicated by reflected ray 80. It is observed that the latter ray 80 and the source ray 76 form the same angle with the paper. By having the photocells 80 disposed so that the light paths from the source and to the photocells form dissimilar angles with the tape the gloss or glare effect is eliminated wherein a black spot could reflect almost as much light as the white background.

Figure 7:
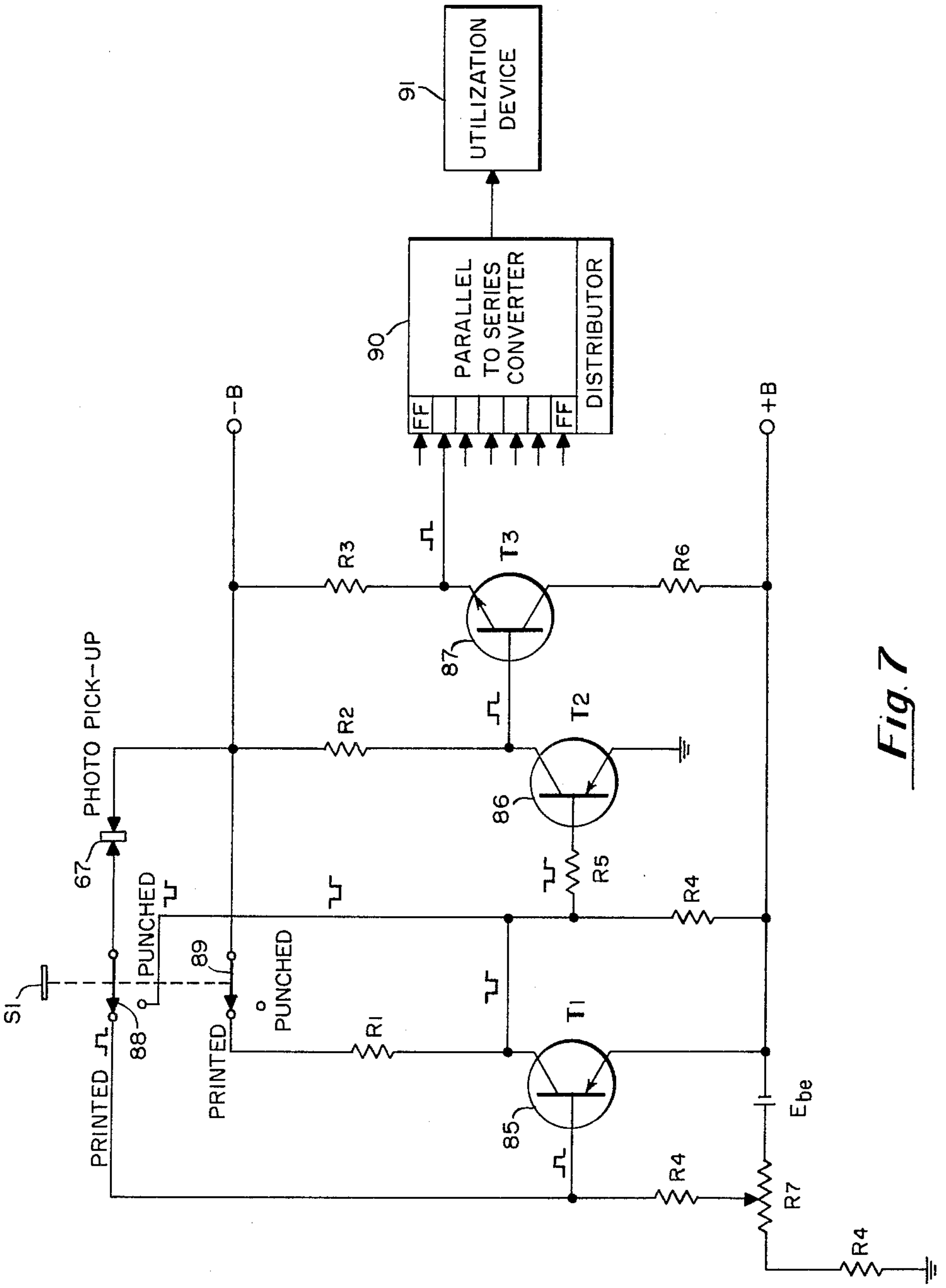
FIG. 7 is a circuit diagram for use in explaining the operation of this invention.

As previously explained, there are seven photo pick-up devices 67 scanning the six channels of coded indicia represented by printed or punched spots in the tape plus the feed channel "F." Reference is made to FIG. 7 which shows an amplifying circuit for one of the individual photo-electric pick-up devices 67 such as photo-transistors or photo-diodes which allow electrical current flow therethrough as a function of the incident light received by the devices.

Switch S1 is shown in the "Printed" position with contacts 88 and 89 closed to apply a signal from photo pick-up 67 to the energized amplifier transistor 85 ($T_1$). The photo pick-up device 67 when reading printed indicia from the tape receives a small amount of incident light from the tape and acts as a high resistance. The point B, electrically the same as the base of transistor 85, is initially at the same negative potential. When the pick-up device so acts as a high resistance, the voltage at point B must readjust, and in so doing it becomes less negative and a positive signal appears at the base of common emitter amplifier transistor 85 ($T_1$). This signal is amplified as a negative pulse at the collector of transistor 85 ($T_1$) and is fed to the base input of the grounded emitter transistor 86 ($T_2$). The negative pulse appearing at the base of the grounded emitter transistor 86 appears at the collector of transistor 86 as a positive pulse. This positive pulse is applied to the base of the emitter follower transistor 87 ($T_3$) and appears at the emitter output of transistor 87 as a positive output pulse. The six photo pick-up devices 67 are operated in parallel to read the coded indicia on the tape and the seventh photo pick-up device 67 scans the sprocket hole or timing half spot 79 on the tape. In the preferred embodiment all seven outputs from the amplifier circuit are shown applied to a parallel-to-series converter 90. It will be understood that the input to the parallel-to-series converter 90 employs seven flip-flops to represent the condition of the seven photo pick-up devices 67 and an electronic distributor is employed to scan the flip-flops and convert the parallel input to a series output which is fed to a utilization device 91. The utilization device 91 may be a series pulse coded input teletype printer, or punch, fed by a single communication line, or the output may be fed directly to an input of a computer.

In the alternate mode of operation of the apparatus, punched holes are read in lieu of the dark spots. Since more incident light strikes the pick-up device than when reading a dark spot, it acts as a low resistance and permits an increase in flow of electron current which appears as a negative going signal. The amplitude of the signal produced is not only much greater but is of opposite polarity relative to the signal produced when reading a printed spot. In order to compensate for the amplitude difference and the opposite polarity, switch S1 is placed in the punched position and bypasses transistor 85 to apply directly the signal from the photo pick-up device 67 to the base of transistor 86. The remaining operation for punched tape through transistor 87, converter 90 and utilization device 91 is identical to that described for the printed tape.

It can be seen that a current limiting device can be incorporated at contact 88 which will sense the greater signal caused by reading punched holes. Such a limiting device may be used to automatically select the correct setting for the switch S1.

The circuit comprising resistors R4, R7 and R4 to ground in the base emitter circuit of transistor 85 is a voltage divider circuit which allows for a critical adjustment of the threshold cutoff of transistor 85.

In the preferred embodiment the electrical components are given the following approximate values:

| | | |
|---|---|---|
| R1 | ohms | 10K |
| R2 | do | 5K |
| R3 | do | 2K |
| R4 | do | 20K |
| R5 | do | 1K |
| R6 | do | 130 |
| R7 | do | 15K |
| $T_1$ | | 2N69 |
| $T_2$ | | 2N69 |
| $T_3$ | | 2N69 |
| Photo pick-up | | 2NE175 |
| +B | v | 6 |
| —B | v | —18 |
| $E_{be}$ | v | 1.5 |

It will be understood from the foregoing description that any well known amplifier and inverter circuits may be applied to the input of a parallel-to-series converter to obtain an output in series form. If it is desired to drive the utilization device with a parallel input, then the parallel-to-series converter is not required. Parallel-to-series inverters and utilization devices are well known in the art and require no further description.

It will be evident that in view of the present disclosure, modification and changes will occur to those skilled in the art and accordingly it is not desired to limit the invention to the specific details of the exemplary embodiments other than as defined in the appended claims.

What is claimed is:

1. In apparatus for sensing a record member bearing a coded pattern of indicia in the form of perforations in transverse rows and columns thereon, a light source on one side of said record member and adapted to direct rays of light through said perforations at a first angle relative to said record member, optical means disposed on the opposite side of said record medium to receive rays of light passed through perforations in the record medium and change the direction of said light rays relative to said source and to thereafter return said light rays back through the same perforations which were entered by said rays thereby forming a second angle with said record medium which is dissimilar to said first angle, photo-sensitive means for detecting said light rays passed back through said perforations for producing electrical signals as a function of the coded pattern of indicia being examined by said apparatus, and circuit means coupled to said photo-sensitive means for receiving said electrical signal and producing amplified output signals.

2. In apparatus for reading indicia disposed in a row in a record member, said indicia being in printed form in one mode of operation thereof, and in perforated form in an alternative mode of operation, a source of energy rays adjacent to one surface of said record member emitted in a direction to intersect said record medium along a line coinciding with the row of indicia thereon, ray-responsive means positioned adjacent to said one surface of said record medium and disposed in a plane substantially normal to said surface and containing said row of indicia on said record medium to receive rays reflected from said printed record medium in a direction substantially normal to the same, and optical means disposed adjacent to the opposite surface of said record member, said optical means including a plurality of angularly related surfaces to reflect rays from said source in said alternate mode of operation which pass through the perforations in said record member and to pass said rays back through the same perforations to said ray-responsive means along said substantially normal plane.

3. Apparatus for reading indicia disposed in a row on a record medium, said indicia being in printed form in one mode of operation and in perforated form in an alternative mode of operation, comprising light source means adjacent to one surface of said record medium for emitting rays of light to intersect said record medium along a line coinciding with the row of indicia thereon, photo-responsive means adjacent to said one surface of said record medium and disposed in a plane substantially normal to said surface and containing the line of intersection whereby in said one mode of operation the reflected rays from said record medium which are substantially normal to the same enter said photo-responsive means, and an optical body having a plurality of angularly related internal reflective surfaces disposed adjacent an opposite surface of said record medium whereby in said alternative mode of operation light from said light source is directed through perforations in said record medium in a direction to enter said body where it is first refracted and thereafter reflected from said reflective surfaces to emerge from the body and pass through the same perforations in a generally reverse direction to enter said photo-responsive means along said substantially normal plane.

4. In apparatus for reading indicia disposed in a row in a record medium, said indicia being in printed form in one mode of operation, and in perforated form in an alternative mode of operation, comprising light source means adjacent to one surface of said record medium for emitting rays of light to intersect said record medium at an acute angle thereto along a line coinciding with a row of indicia thereon, photo-responsive means adjacent to said one surface of said record medium and disposed in a plane substantially normal to said one surface and containing said line of intersection and to receive in said one mode of operation reflected rays from the printed indicia which are normal to the record medium, and optical means disposed adjacent to the opposite surface of said record medium and substantially in the plane of said photo-responsive means, said optical means including a plurality of internal light reflecting surfaces angularly related to one another whereby rays of light pass through perforations are successively reflected from said internal light reflecting surfaces to thereafter emerge from said optical means to pass back through the same perforations a second time and into said photo-responsive means.

5. In apparatus for reading indicia disposed in rows and columns in a tape, said indicia being in printed form in one mode of operation and in perforated form in an alternative mode of operation, comprising light source means adjacent one surface of said tape for emitting rays of light to intersect said tape along a line coinciding with a row of indicia thereon, photo-responsive means displaced from said light source and adjacent to said one surface and in one mode of operation to sense indirectly reflected rays of light which form angles with the tape which are dissimilar to the angle of incidence formed by the light rays emitted from said source, and an optical prism having multi-reflective internal surfaces disposed adjacent an opposite surface of said tape whereby in said alternative mode of operation light from said light source passes through perforations in said tape and into said prism where it is first refracted and is thereafter reflected from said reflective surfaces to emerge from the prism and pass through the same perforations a second time but in a direction to be received by said photo-responsive means.

6. In apparatus for reading indicia disposed in rows and columns in a tape, said indicia being in printed form in one mode of operation and in perforated form in an alternative mode of operation, comprising means for moving said tape columnwise along a given path thus to present successive rows of indicia to be read, light source means adjacent to one surface of said tape for emitting rays of light to intersect said tape along a line coinciding with a row of indicia thereon, photo-responsive means adapted to emit output signals corresponding to the row of indicia being examined by the apparatus and located adjacent to said one surface of said tape and disposed in a plane substantially normal to said surface and containing said line of intersection so that in said one mode of operation the reflected rays from said printed tape which are substantially normal to the same are adapted to enter said photo-responsive means, an optical body having a plurality of internal reflective surfaces disposed adjacent to the opposite surface of said tape whereby in said alternative mode of operation light from said light source strikes said body where it is first refracted and is thereafter reflected from said reflective surfaces to emerge from the body and pass through the same perforations to said photo-responsive means along said substantially normal plane, circuit means coupled to said photo-responsive means and capable of operating in two different states, said circuit means being operable in one state to provide an output signal of said photo-responsive means representative of said first mode of operation of the apparatus and being operable in the other state to provide an output signal of said photo-responsive means representative of said second mode of operation of the apparatus, and switch means for rendering said circuit means operable in one or the other of its two different states.

7. In apparatus for reading coded indicia disposed in rows and columns in a tape, said indicia being in printed form in one mode of operation thereof and in perforated form in an alternative mode of operation, comprising means for moving said tape columnwise along a given path, light source means adjacent to one surface of said tape for emitting rays of light to intersect said tape at an acute angle thereto along a line coinciding with a row of indicia thereon, photo-responsive means adapted to emit electrical signals as a function of the row of coded indicia being examined by the apparatus and located adjacent to said one surface of said tape and disposed in a plane substantially normal to said surface to receive in said one mode of operation the reflected rays from said printed tape which are normal to the same, optical means supported within recessed portions of said anvil means, said optical means including a prism quadrangular in form having a plurality of angularly related surfaces silvered to reflect light internally within said prism whereby in said alternative mode of operation light rays from said source passing through perforations in said tape enter said prism where the same are reflected from said surfaces and thereafter emerge from said prism to again pass through the same perforations a second time in a direction to be received by said photo-responsive means.

8. In apparatus for sensing a record member bearing a coded pattern of indicia in the form of perforations in transverse rows and columns thereon, a light source disposed on one side of said record member and adapted to direct rays of light through said perforations, an optical device disposed on the opposite side of said record member to receive and turn the light rays in a loop while in the optical device and in a direction to be emitted from said optical device and back through the same perforations in said record member, photo-sensitive means for detecting said emitted rays and for producing electrical signals as a function of the coded pattern of indicia contained on said tape, and circuit means coupled to said photo-sensitive means for receiving said electrical signals and producing amplified output signals.

9. In apparatus for sensing a perforation in a member comprising a light source disposed on one side of said member and adapted to direct rays of light through said perforation, an optical device disposed on the opposite side of said member to receive and turn the light rays in a loop while in the optical device and in a direction to be emitted from said optical device and back through the same perforation in said member, photo-sensitive means for detecting said emitted rays and for producing an electrical signal, and circuit means coupled to said photo-sensitive means for receiving said electrical signal and producing an amplified output signal.

References Cited in the file of this patent

UNITED STATES PATENTS

| | | |
|---|---|---|
| 2,178,244 | Sachtleben | Oct. 31, 1939 |
| 2,448,830 | Robbins et al. | Sept. 7, 1948 |
| 2,617,048 | Wagner et al. | Nov. 4, 1952 |
| 2,872,590 | Leavens | Feb. 3, 1959 |
| 2,967,497 | Braun et al. | Jan. 10, 1961 |